Sept. 14, 1965   R. L. LILLESTRAND   3,206,151
ROTARY CYLINDER LEVEL
Filed March 29, 1961   4 Sheets-Sheet 1
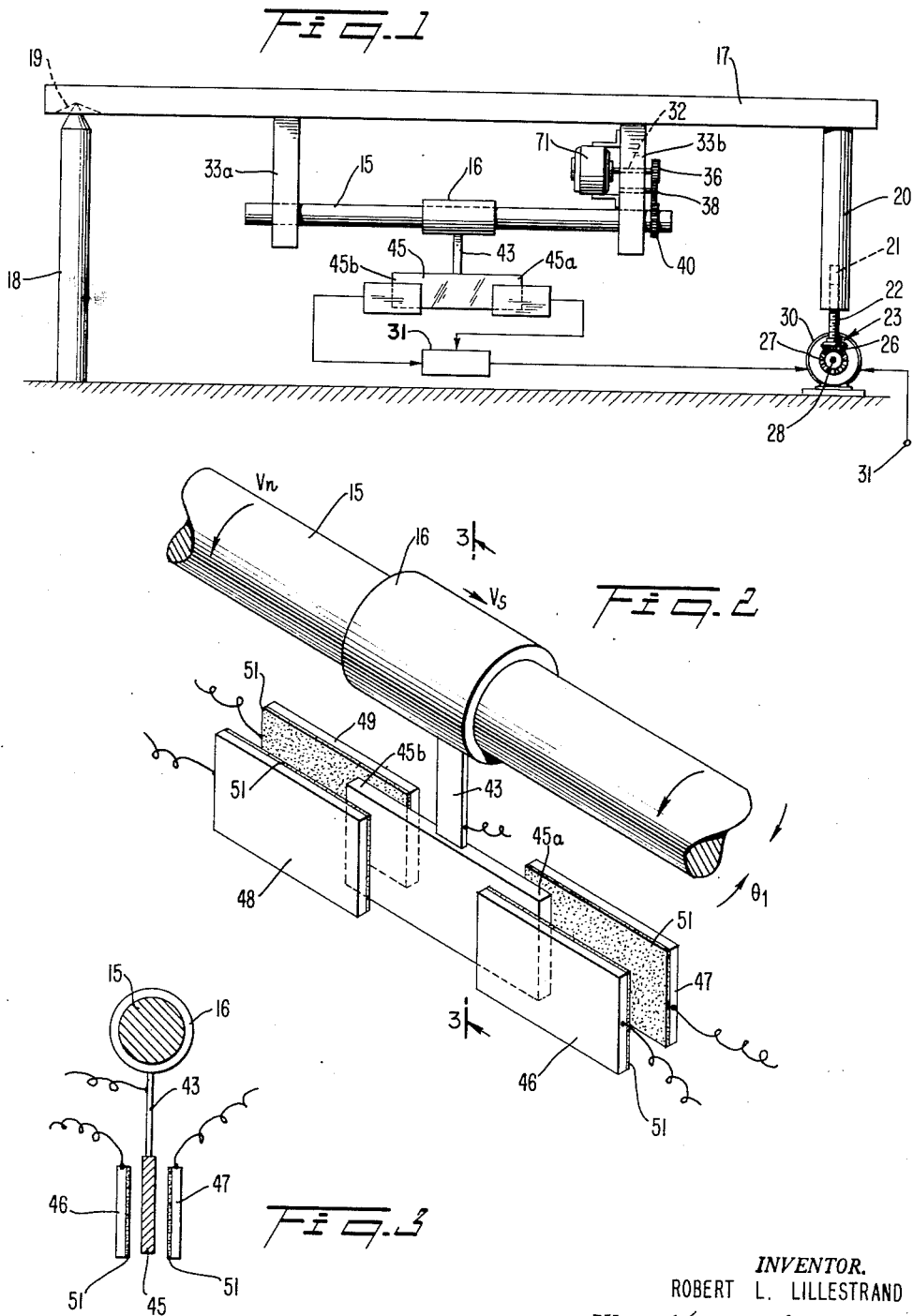
INVENTOR.
ROBERT L. LILLESTRAND
BY Kenneth D. Ohm
ATTORNEY Sept. 14, 1965     R. L. LILLESTRAND     3,206,151
ROTARY CYLINDER LEVEL Filed March 29, 1961     4 Sheets-Sheet 2

INVENTOR.
ROBERT L. LILLESTRAND
BY Kenneth D. Ohm
ATTORNEY

Sept. 14, 1965 R. L. LILLESTRAND 3,206,151
ROTARY CYLINDER LEVEL
Filed March 29, 1961 4 Sheets-Sheet 3

INVENTOR.
ROBERT L. LILLESTRAND
BY Kenneth D. Ohm
ATTORNEY

INVENTOR
ROBERT L. LILLESTRAND
BY Kenneth D. Ohm
ATTORNEY

United States Patent Office 3,206,151
Patented Sept. 14, 1965

3,206,151
ROTARY CYLINDER LEVEL
Robert L. Lillestrand, Minneapolis, Minn., assignor to General Mills, Inc., a corporation of Delaware
Filed Mar. 29, 1961, Ser. No. 99,180
1 Claim. (Cl. 248—188.4)

This invention relates to a system for leveling and more particularly to a device for detecting very slight departures from level condition.

Prior leveling devices such as the liquid type with an air bubble in a tube of liquid have been limited in their degree of accuracy, especially when the angle of tilt is very slight.

An important object of this invention is to provide a leveling device of exceedingly high potential sensitivity.

Another important object of the invention is to provide a leveling device having an error integrating characteristic, a detected small tilt angle, and wherein the slightest angle of tilt is readily detectable, resulting in sufficient displacement of parts of the device embodying the invention to permit ready detection of very small angles of tilt.

A further object of this invention is to provide a leveling device for manual and automatic leveling operations wherein accuracy is of prime importance and wherein the means for detecting the tilt can be used as signal means to correct the tilt.

This invention includes a method and apparatus for detecting departures from a level condition comprising broadly two members, one member rotating about a horizontal axis and the other member being slidably mounted on the surface of the rotating member for sliding displacement axially when the axis of the rotating member is tilted from the horizontal. The direction and the velocity of the sliding movement are directly correlated to the angle of tilt.

The sliding member moves at a rapidly established equilibrium velocity which is proportional to the angle of tilt. Therefore, even for a very small angle of tilt the physical displacement of the slider becomes very large when sufficient time is allowed.

With any one of a number of suitable transducers, the displacement of the slider can be detected readily and used for signalling warning or for actuating means for automatically restoring the structure to which the leveling device is affixed to level condition.

For a more complete description of the invention reference is made to the drawings, wherein:

FIG. 1 is a schematic front view of one form of leveling device embodying the invention affixed to a structure for automatically leveling the structure;

FIG. 2 is a perspective view with parts cut away showing certain elements of the leveling device shown in FIG. 1;

FIG. 3 is a sectional view taken along the line 3—3 in FIG. 2;

Figure 4:
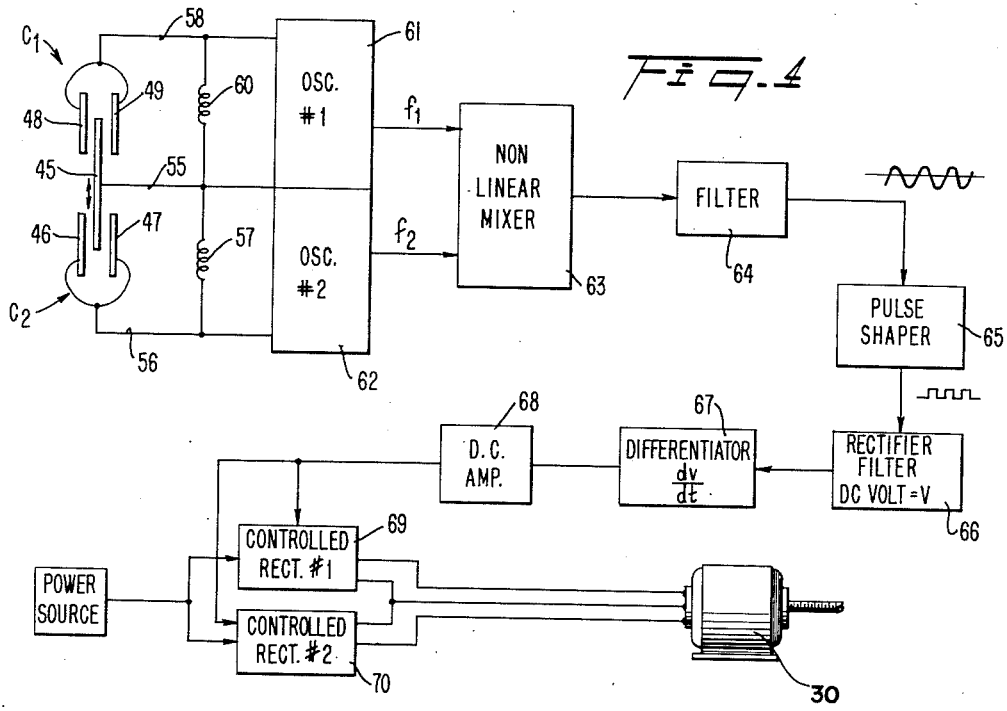
FIG. 4 is a diagrammatic view of the components for the level control shown in FIG. 1.

Referring to FIGS. 1-3, the components of the leveling device in the presently preferred form include a rotating cylindrical member 15 and a freely moving slider 16 mounted on the member 15. The rotating cylindrical member 15 is accurately positionable so that the velocity of the lateral movement of the slider 16 is proportional to the angle of tilt of the cylinder for low angles.

In the schematic arrangement of the leveling device embodying the invention, shown in FIG. 1, the device is arranged for automatically leveling the structure to which it is attached. The structure comprises a platform 17 having one or more post supports 18. The platform 17 is pivotally supported on the post or posts 18 to permit adjustment of the platform by means of the adjustment means provided on leveling post 20. The adjustment means may be comprised of an internally threaded recess 21 and a shaft 23 having an externally threaded upper portion 22 screwed part way into said recess 21; said shaft 23 having a bevel gear 26 mounted on the lower end thereof for engagement with bevel gear 27 attached to the shaft 28 of reversible motor 30. The motor 30 is driven by suitable power means indicated schematically at 31 but not otherwise shown. In order to adjust the platform 17 to a level condition, shaft 23 is rotated by the motor 30 through the bevel gears 27 and 26 so that the threaded portion of the shaft 23 moves into or out of the internally threaded recess 21 on the leveling post, whereby the end of the platform adjacent the post is either raised or lowered about the pivot point 19 provided on the post 18.

In order to determine when the platform is not level the leveling device of this invention is provided disposed below the platform 17, the rotating shaft 15 of the leveling device being supported in suitable bearings provided in supporting brackets 33a and 33b which depend from the lower side of the platform 17. The motor 71 mounted on bracket 33b may be adapted for rotating the shaft or cylinder 15 at a continuous rate of speed, the motor being connected with the rotating shaft 15 through a shaft 32 and a suitable gear train 36, 38 to gear 40 mounted on the rotating shaft 15.

The sleeve or slider 16 is slidably mounted on the rotating shaft 15 and is adapted for easy sliding motion on the rotating shaft, so as to move axially along the shaft. The shaft 15 rotates and the sleeve is non-rotating with respect to it. Depending from the slider 16 is a hanger 43 and a plate 45 which may extend somewhat beyond the axial extent of the slider, the plate 45 being substantially vertical and remaining in such vertical condition but being adapted to slide horizontally as the slider member moves axially along the shaft 15. The end 45a of the plate 45 extends between plates 46 and 47 and the end of the plate 45b extends between vertical plates 48 and 49.

Referring to FIGS. 2 and 3 it will be noted that the plates 46 and 47 are electrically connected as shown in FIG. 4 to measure the change in value of capacitance as the end 45a advances into or retracts from its position between those plates. Similarly, the plates 48 and 49 are electrically connected to measure the changes in the value of capacitance as the end 45b advances into or retracts from its position between those two plates. It will be noted that as the end 45a of plate 45 withdraws from between plates 46 and 47 the end 45b advances the same distance into position between plates 48 and 49 so as to provide complementary variable capacitors. The plates 45, 46, 47, 48 and 49 are of electrically conductive material. The inner surfaces 51 of the plates 46, 47 and the inner surfaces of plates 48, 49 are provided with suitable dielectric material so that there can not be direct electrical contact between the outer capacitance plates and the plate 45.

Reference is made to FIG. 4 for a description of the manner in which a change in capacitance value, caused by the movement of the slider 16, is employed to restore the platform 17 to level condition.

FIG. 4 is a schematic block diagram of suitable major circuit components of a preferred circuit system for detecting or sensing displacement of sleeve 16 and for initiating a corrective control signal to effect a return of the leveling shaft 15 to a balance condition. As illustrated, the capacitor C1, formed of fixed plates 48, 49 and sliding plate 45, is paralleled by an inductance 60 to form a tuned circuit for a first oscillator unit 61 whose output frequency $f_1$ will be responsive to the capacitance of said capacitor C1. In a similar manner, capacitor C2 formed of fixed plates 46, 47, and sliding plate 45 is paralleled by an inductance 57 to form a tuned circuit for a second oscillator unit 62 whose output frequency $f_2$ will be responsive to the capacitance of said capacitor C2. The first and second oscillator units 61 and 62 will thus have their respective output frequencies $f_1$ and $f_2$ controlled by the positioning of the sliding sleeve 45. Preferably, the circuit constants of each oscillator are such as to make them extremely sensitive to small changes in capacitance.

The oscillatory outputs of the first and second oscillator units 61 and 62 are fed into a nonlinear mixer 63 which provides a mixed output formed of a first wave having a frequency equal to $f_1$ plus $f_2$ ($f_1+f_2$) and a second wave having a frequency equal to $f_1$ minus $f_2$ ($f_1-f_2$). The mixer output is fed into a band pass filter 64 arranged to filter out the ($f_1+f_2$) frequency wave and to pass the ($f_1-f_2$) frequency wave.

The essentially sinesoidal ($f_1-f_2$) output of the filter 64 is fed into a pulse shaper 65 of the Schmidt trigger type wherein the sinesoidal wave is converted into an essentially square wave of uniform width and amplitude. The square wave output of the pulse shaper 65 is then introduce into a rectifying filter circuit 66 to convert said square wave into a D.C. output whose magnitude is proportional to the frequency value ($f_1-f_2$). The D.C. output of the rectifying filter 66 is fed into a differentiator circuit 67 whose output will have a magnitude proportional to the rate of change of the incoming signal and a polarity determined by the direction of the change in said incoming signal. Such differentiator output serves as a control signal. The control signal output of the differentiator 67 is then amplified in the amplifier 68 and jointly applied to a pair of controlled rectifiers 69 and 70 in such manner that if the polarity amplified control signal is positive in nature, the output of the controlled rectifier 69 will effect rotation of a motor 30 in one direction and if the polarity amplified control signal is negative in nature the output of the controlled rectifier 70 will effect motor rotation in the opposite direction. As previously explained, selective direction of rotation of the motor 30 effects a displacement of the leveling shaft 23, which in turn effects a leveling displacement of the platform 17.

In operation of the subject system, displacement of the sliding plate member 45 effects a complemental variation in the capacitance of the capacitors C1 and C2. Such complemental capacitance variation effects a proportionate change in the output frequencies of the oscillators 61 and 62 and a concomitant magnitude variation in the mixed frequency ($f_1-f_2$) output of the filter circuit 64. The magnitude of the variation in the differential frequency output ($f_1-f_2$) of the filter circuit 64 will effect a concomitant variation in the output frequency of the pulse shaping network 65 and a consequent change in the magnitude of the D.C. output of the rectifier filter circuit 66. The changing output of the rectifier filter circuit 66 is then differentiated in the differentiator circuit 67 to provide a control signal whose magnitude will be proportional to the rate of change of the D.C. input and whose polarity will be controlled by the direction of such change. These control signals are then amplified and utilized to selectively control the direction of rotation of the motor 30 in such manner as to re-level the system through suitable displacement of the leveling shaft 23.

Figure 5:
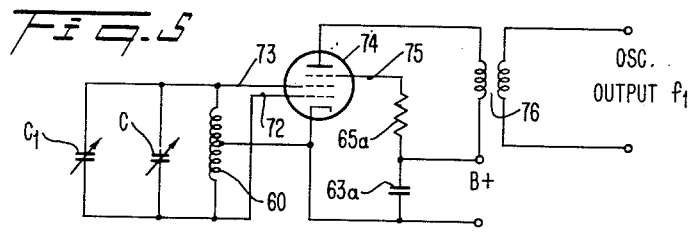
FIG. 5 is a circuit diagram of one of the oscillators shown in FIG. 4.

FIG. 5 is a schematic circuit diagram of the essentials of a suitable oscillator unit adapted for use in the subject device. As there illustrated, the capacitor C1 is connected in parallel with a capacitor C and the inductance 60 to form a tuned circuit connected across the control and screen grids 72, 73 of a pentode type vacuum tube 74. The suppressor grid 75 of the tube 74 is connected to the B+ supply through a resistor 65a and isolated from ground by a condenser 63a. The oscillatory output of the tube 74 is coupled to the output lines by a coupling transformer 76. The illustrated oscillator preferably incorporates a high LC ratio so as to render it particularly sensitive to variations in capacitance, i.e. it is so arranged that a small change in capacitance C1 causes a relatively large change in the output frequency.

Figure 6:
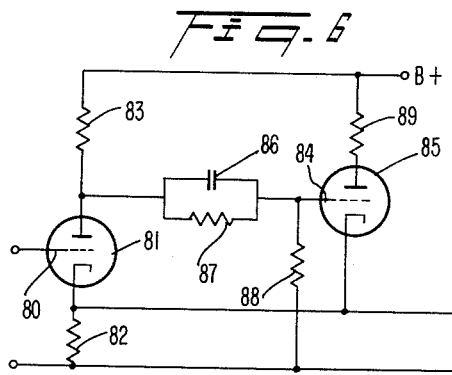
FIG. 6 is a circuit diagram of the pulse shaper shown in FIG. 4.

FIG. 6 is a schematic circuit diagram of a suitable pulse shaping network of the Schmidt trigger type that is adapted for use in the subject device. As illustrated, the input is connected to the control grid 80 of a triode vacuum tube 81. The cathode of said tube is connected to ground through a resistor 82 and the plate thereof is connected to the plate supply voltage through a plate load resistor 83. The plate of the tube 81 is coupled to the control grid 84 of a second triode tube 85 through an RC network formed of a capacitor 86 paralleled by a resistor 87. The grid 84 of the second stage 85 is biased to ground by a resistor 88 and the plate thereof is connected to the plate supply voltage through a plate load resistor 89. The output of the circuit is taken from across resistor 82 in the cathode circuit of the first tube 81. In such a circuit, the output is clamped to zero and the positive pulse length is controlled by the frequency of the input wave. The width and amplitude of the raised portion of the output wave therefrom are essentially constant. As the differential frequency input ($f_2-f_2$) increases, the number of output pulses per unit time are increased with a concomitant increase in the average voltage value thereof.

Figure 7:
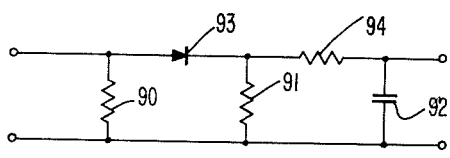
FIG. 7 is a circuit diagram of the rectifier filter shown in FIG. 4.

FIG. 7 is a schematic circuit diagram of a suitable rectifier filter unit adapted for utilization in the subject device. As there illustrated, the subject circuit includes a pair of resistors 90, 91 and a capacitor 92 connected across the lines. Included in the line intermediate the resistors 90 and 91 is a rectifier element 93 and disposed in series therewith and intermediate the resistor 91 and capacitor 92 is a resistor 94. As earlier discussed, this rectifier filter takes the output of the pulse shaper circuit and provides a D.C. voltage output, the magnitude of which is proportional to the magnitude differential frequency output ($f_1-f_2$) of the filter 64.

Figure 8:
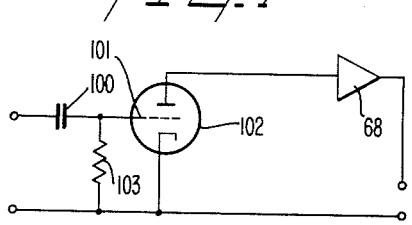
FIG. 8 is a circuit diagram of the differentiator shown in FIG. 4.

FIG. 8 is a schematic circuit diagram of a suitable differentiator circuit adapted for utilization in the subject device. As illustrated, the D.C. output of the rectifier filter 66 is applied through a coupling condenser 100 to the control grid 101 of a triode tube 102. The grid 101 is provided with a grid leak resistor 103 and the tube cathode is connected directly to ground. The plate output of the tube 102 is fed through a D.C. amplifier 68 to provide a control signal whose magnitude will be proportional to the rate of change of the incoming D.C. signal and whose polarity will be controlled by the direction of such change. The output control signal is, as described earlier, utilized to selectively control the direction of rotation of the motor 30 which, in turn, initiates a physical displacement of the leveling shaft 23 to return the platform 17 to a balance condition.

In operation when the rotating cylinder shaft 15 is slightly inclined from a level position, the sliding member 16 is acted upon by a gravity component which is parallel to the shaft 15. The rate of movement of the sliding member down the inclined rotating shaft 15 is dependent upon the coefficient of friction ($u$) between the member 16 and the rotating shaft 15, the peripheral velocity ($V_r$) of the shaft and the angle of inclination ($\theta_i$) of the shaft relative to horizontal or a predetermined level position.

The formula for determining the lateral velocity ($V_s$) of the sliding member 16 along the rotating shaft is:

$$V_s = \frac{V_r}{\sqrt{\left(\frac{u}{\tan \theta_i}\right)^2 - 1}}$$

Normally $$\left(\frac{u}{\tan \theta_i}\right)^2$$

is greater than 1 and $\tan \theta_i$ is congruent to $\theta_i$

Therefore, the above expression can be simplified to the following:

$$V_s = \frac{\theta_i V_r}{u}$$

As an example of the application of this equation, consider the following case: the diameter of shaft or cylinder is 2 inches; speed of rotation is 200 r.p.m.; coefficient of friction ($u$) is 0.05 and the angle of inclination ($\theta_i$) is 10 seconds of arc.

$$V_s = \left(\frac{5 \times 10^{-5}}{5 \times 10^{-2}}\right) \cdot 2\pi \cdot 200 = 1.26 \text{ inches per minute}$$

Thus, if the cylinder were tilted by 10 seconds of arc, the slider 16 would move laterally along the cylinder at a rate of 1.26 inches per minute. The foregoing is merely illustrative to indicate a given operating condition. It will be appreciated, however, that the design range for the instrument as to cylinder diameters, speeds and coefficients of friction may be widely varied to obtain desired operating conditions.

As a further example with a rotating shaft of .5 inch and a speed of rotation of 1800 r.p.m., length of rotor shaft being 4 inches, tilt angle, $\theta$ is 10 seconds is equal to $5 \times 10^{-5}$ radians, and the coefficient $$V_s = \frac{5 \times 10^{-5} (2\pi 1800 \times .25)}{.1}$$

$$V_s = 5 \times 10^{-4} \quad 2.2 \times 10^3 = 1.41 \text{ inches/min.}$$

$$= .0235 \text{ inch/second}$$

This last figure is the steady state sliding velocity. There is a certain time lag to reach that velocity which may be expressed by the following equation:

$$V_s = \frac{V_r \theta}{u}\left(1 - \theta - \frac{ugt}{V_r}\right)$$

$$\frac{ugt}{V_r} = 1 \quad t = \frac{V_r}{ug}$$

$$t = \frac{2\pi 1800 \times .25}{60 \times .1 \times 32 \times 12} \text{ sec.}$$

$$= 6.28 \times 4.5 \times 10^2$$

$$= \frac{2830}{2300}$$

=1.23 sec. of time to reach 63% of the steady state velocity.

Figure 10:
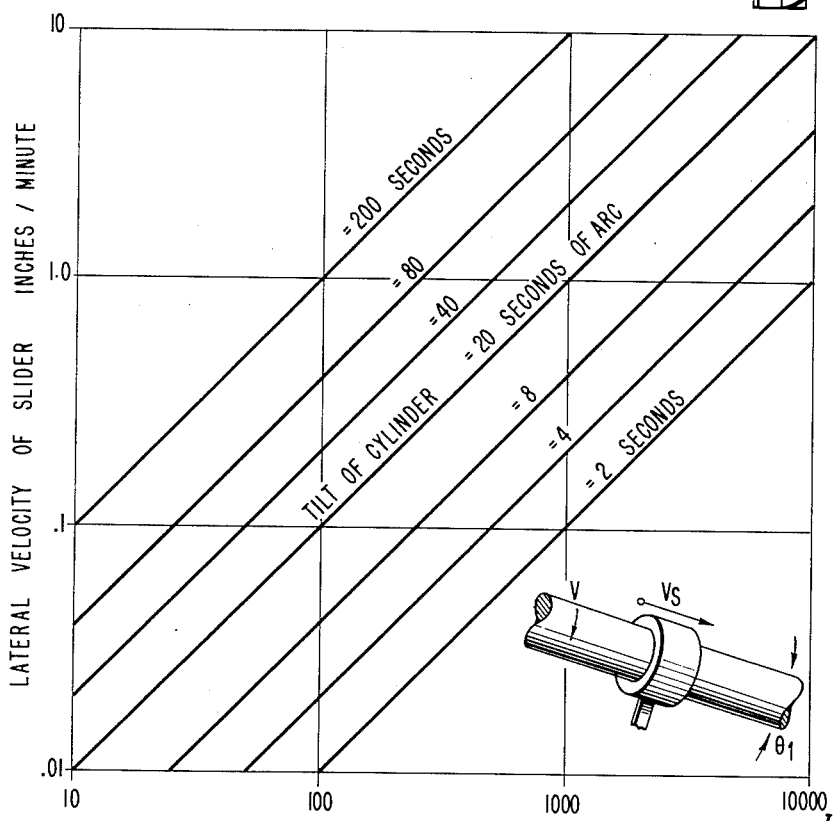
FIG. 10 is a graph showing the relation between the tilt of the cylindrically rotating member to the velocity of the slider.

In FIG. 10 there is shown the relation of tilt of the rotating shaft and the velocity of the sliding member. Thus for example if a rotating shaft or cylinder had a surface velocity of 1000, at a tilt of 20 seconds of arc, the lateral velocity of the slider is 1.0 inch per minute or .0167 inch per second.

Figure 9:
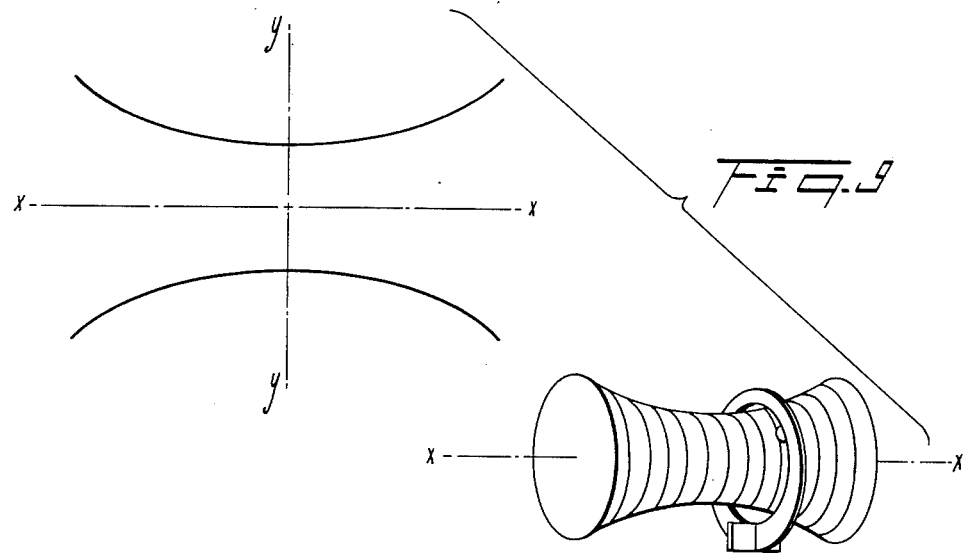
FIG. 9 is a diagram and a perspective view of a surface of revolution for another form of rotating member which can be employed in this invention.

If the surface of revolution for the rotating member is non-cylindrical such for example as shown in FIG. 9 various positions of the slider can correspond to certain tilt angles. This is in contrast with the cylindrical level where the position of the slider along the shaft or cylinder is not uniquely defined when the cylinder is level.

As illustrated in FIG. 9 the shape of the non-cylindrical shaft may be such for example that the tilt angle is proportional to the distance along the axis from some point in which case the profile would be:

$$\text{Tilt angle} = \frac{dy}{dx} = x \text{ or } y = c_0 x^2 + c_1$$

In FIG. 9, assuming the point of zero slope, i.e. level condition, is centrally located by the vertical line $y$, the $x$ axis is the axis of rotation. By selecting an exponential function for the profile, a wide range of tilt angles may be covered with a single rotating member.

The slider member mounted on the rotating element in FIG. 9 may be designed as shown to contact the rotating element at two points only. The contact points may be spherical in shape. The center of gravity of the slider should be below the level of the contact points in order to achieve a pendulous supporting structure. The radius of curvature of the spherical shaped contact points should be known and included in the calculations along with the slope of the axially symmetric surface of the rotating member when calculating the equilibrium position of the slider member. In the event that the plate depending from the slider member in FIG. 9 tends to oscillate, magnetic damping means may be used to prevent such oscillation.

It will be appreciated that in the system of this invention it is important to keep the coefficient of friction as low as possible in order to maintain high sensitivity. Values of less than 0.1 are desirable and not too difficult to attain with proper lubrication. Ultra low values of friction could be obtained using a boundary layer of air. The bearings which support the rotating cylinder should be as free of runout as possible. By matching bearing eccentricities, it is possible to keep eccentric wobble to less than $10^{-4}$ inches. If the bearings are 10 inches apart, the eccentricity error angle would be greater than $10^{-5}$ radians or aproximately 2 seconds of arc.

When the leveling device of this invention is tilted through very small angles, e.g. a few seconds of arc or less, the magnitude of the friction force (proportional to $uN$) will determine the response rate. As noted normally the reduction of the coefficient of friction is accomplished by a lubricant or with an air bearing. However, an alternative is to reduce the normal force. This can be done by supporting the free moving element with an upward moving current of air or a magnetic or electric field. The result is that N is reduced in the frictional force term $uN$. If the weight of the free moving element can be completely balanced no frictional force will be encountered. In such case the sliding element will accelerate as it moves along, rather than reaching a limiting velocity. By such means a device of high sensitivity can be achieved.

Figure 11:
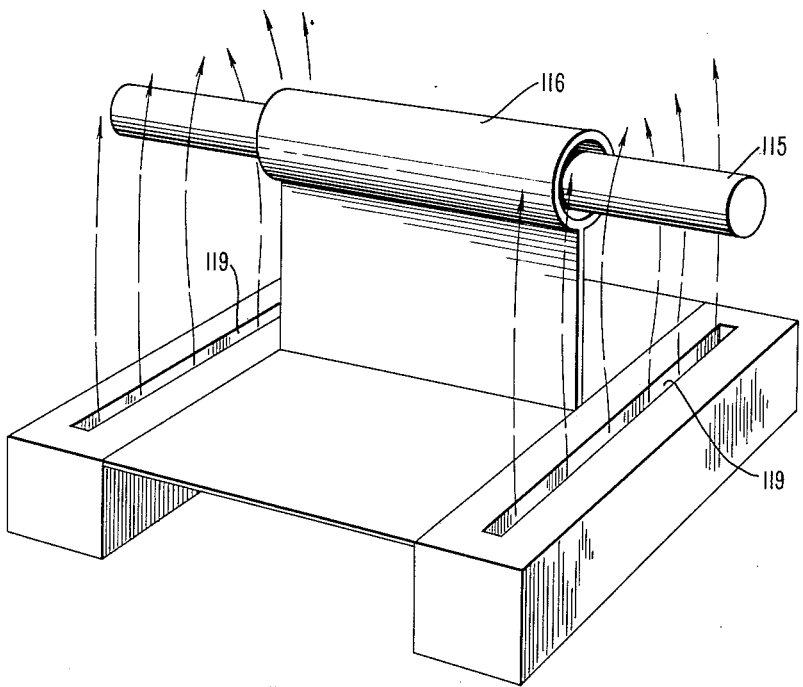
FIG. 11 is a schematic view of another embodiment of invention.

FIG. 11 illustrates an apparatus in which shaft 115 is a rotating free moving member which is supported by air streams issuing from air slots 119. Sleeve 116 is fixed and attached to a platform with which the device is to be used. The shaft 115 may be rotated by any suitable means including providing fins or other means to cause rotation by the supporting air streams. Using two spaced air streams of controllable velocity for supporting the shaft 115 at spaced locations the normal forces are minimized, the upward drag of the air being equal to the weight of the shaft. The sleeve 116 may serve to maintain the shaft in position over the air streams. For purposes of measuring variations from level the lateral movement of the rotating shaft may be measured in any suitable way, for example photoelectrically, the output signal from such means may then be used to return the apparatus to level in the manner shown in FIG. 1. In view of the fact that a large displacement of the shaft 115 would eventually cause an unbalance of the constraining forces which are supplied by the cylinder 116, it will be understood that the control system associated with this device will act to keep the shaft 115 approximately centered. A small unbalance due to the displacement of the shaft 115 will not cause an error in the measurement, but merely a small change in the response of the instrument.

Figure 12:
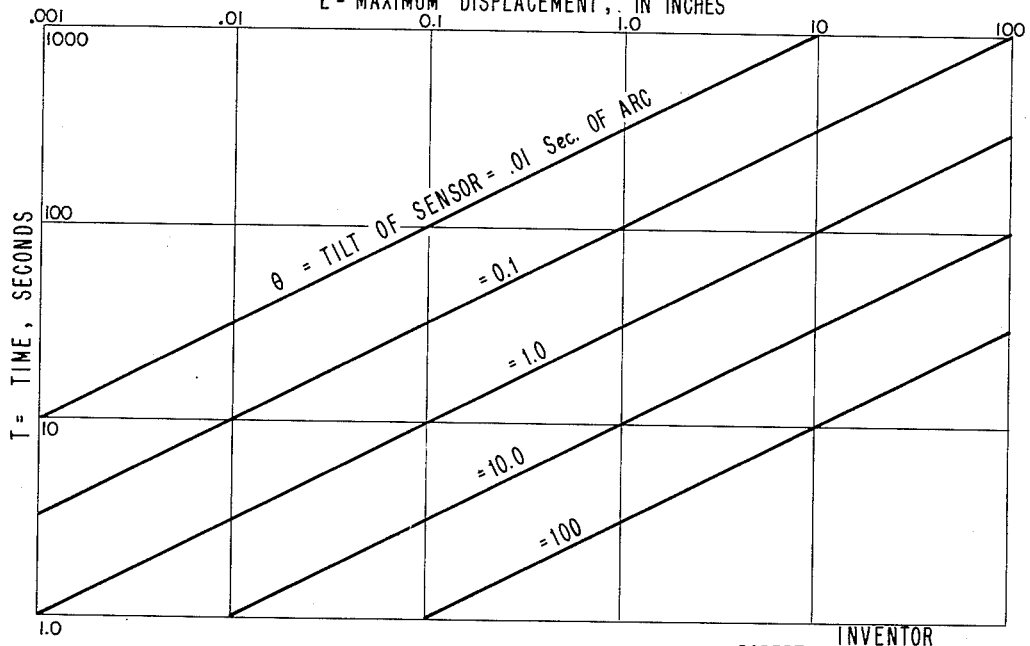
FIG. 12 is a graph showing lateral displacement.

In the graph shown in FIG. 12, the lateral displacement of the free moving shaft 115 as a function of the angle of tilt and duration of acceleration.

$\theta$=tilt of the sensor
$S$=Maximum Displacement in inches
$T$=time in seconds $S$ is congruent to $\frac{1}{2}g\theta t^2$ Referring to the graph, for example, if the rotating sensor 115 were tilted through an angle of .01 sec. of arc, a displacement of 0.1 inch will be obtained after 100 seconds.

From the foregoing it will be appreciated that the invention described achieves the object of providing a leveling device of exceedingly high potential sensitivity and the other objects set out above.

It will be understood that whereas the invention has been described it is as embodied in the presently preferred form that changes and departures may be made from the described embodiments. The scope of the invention is defined in the following claim.

What is claimed is:

A leveling device for maintaining a structure level comprising a rotating member supported on said structure with the axis of said member level when the structure is in level condition, said rotating member having a surface of increasing diameter in opposite directions along the axis thereof from a center point, a slider slidably mounted on the rotating member for sliding displacement axially on said rotating member when the axis of said rotating member is caused to tilt from the level, means for detecting the position of the slider, means for adjusting the structure to restore it to level, motor means for operating said adjusting means, and means for producing signals for controlling the motor means from said detecting means.

References Cited by the Examiner

UNITED STATES PATENTS

| | | | |
|---|---|---|---|
| 2,252,727 | 8/41 | Pepper. | |
| 2,613,071 | 10/52 | Hansel | 73—490 X |
| 2,840,366 | 6/58 | Wing | 73—497 |
| 2,893,134 | 7/59 | Shea et al. | 33—206.5 |
| 2,948,152 | 8/60 | Meyer | 73—514 |
| 2,958,137 | 11/60 | Mueller | 33—206.5 |

ISAAC LISANN, *Primary Examiner.*

ROBERT L. EVANS, *Examiner.*